Dec. 19, 1933.   F. R. RUMPEL   1,940,017
AUTOMATIC HEN'S NEST
Filed Oct. 22, 1931   2 Sheets-Sheet 1
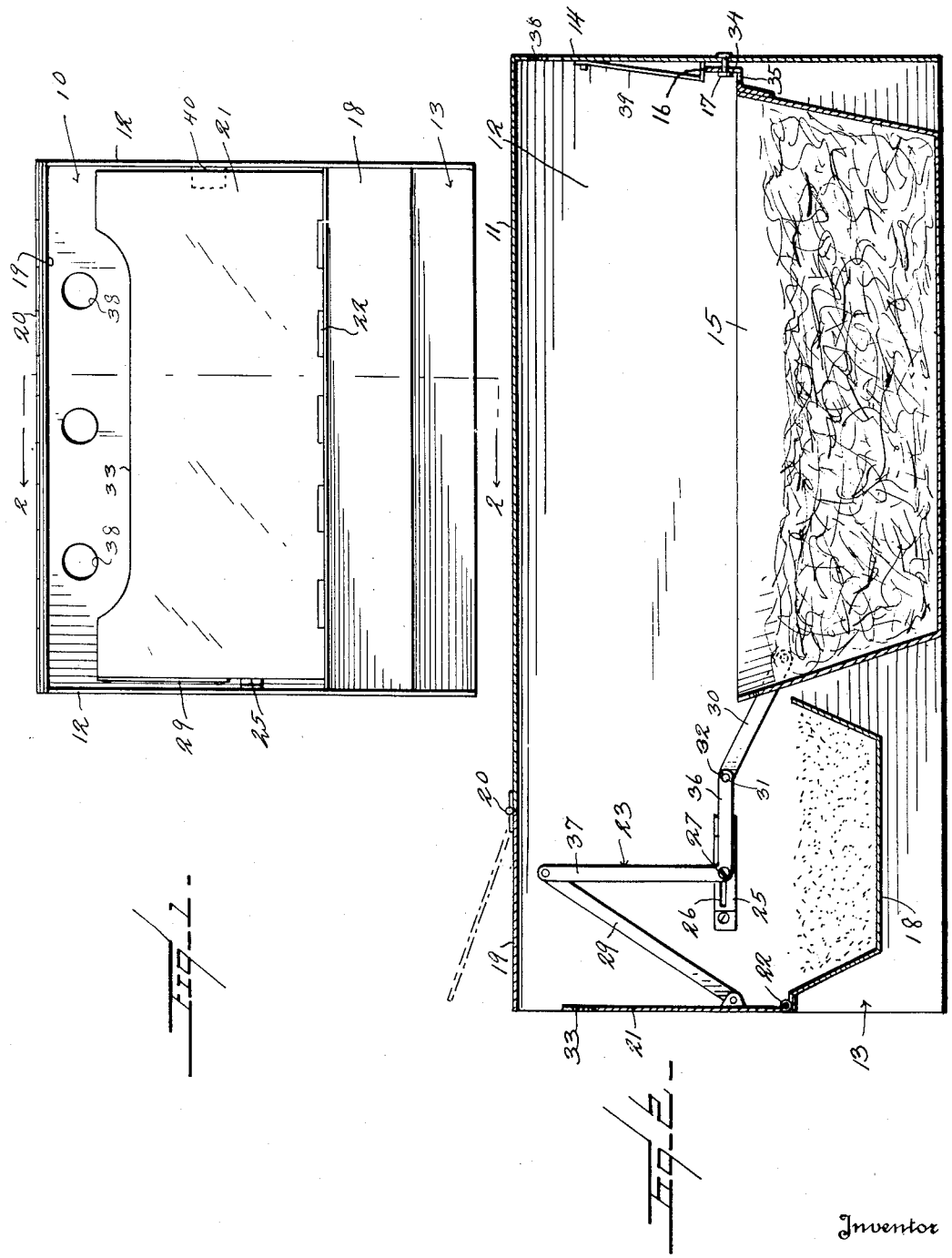
Inventor
F. R. Rumpel
By Watson E. Coleman
Attorney Dec. 19, 1933.  F. R. RUMPEL  1,940,017
AUTOMATIC HEN'S NEST
Filed Oct. 22, 1931   2 Sheets-Sheet 2
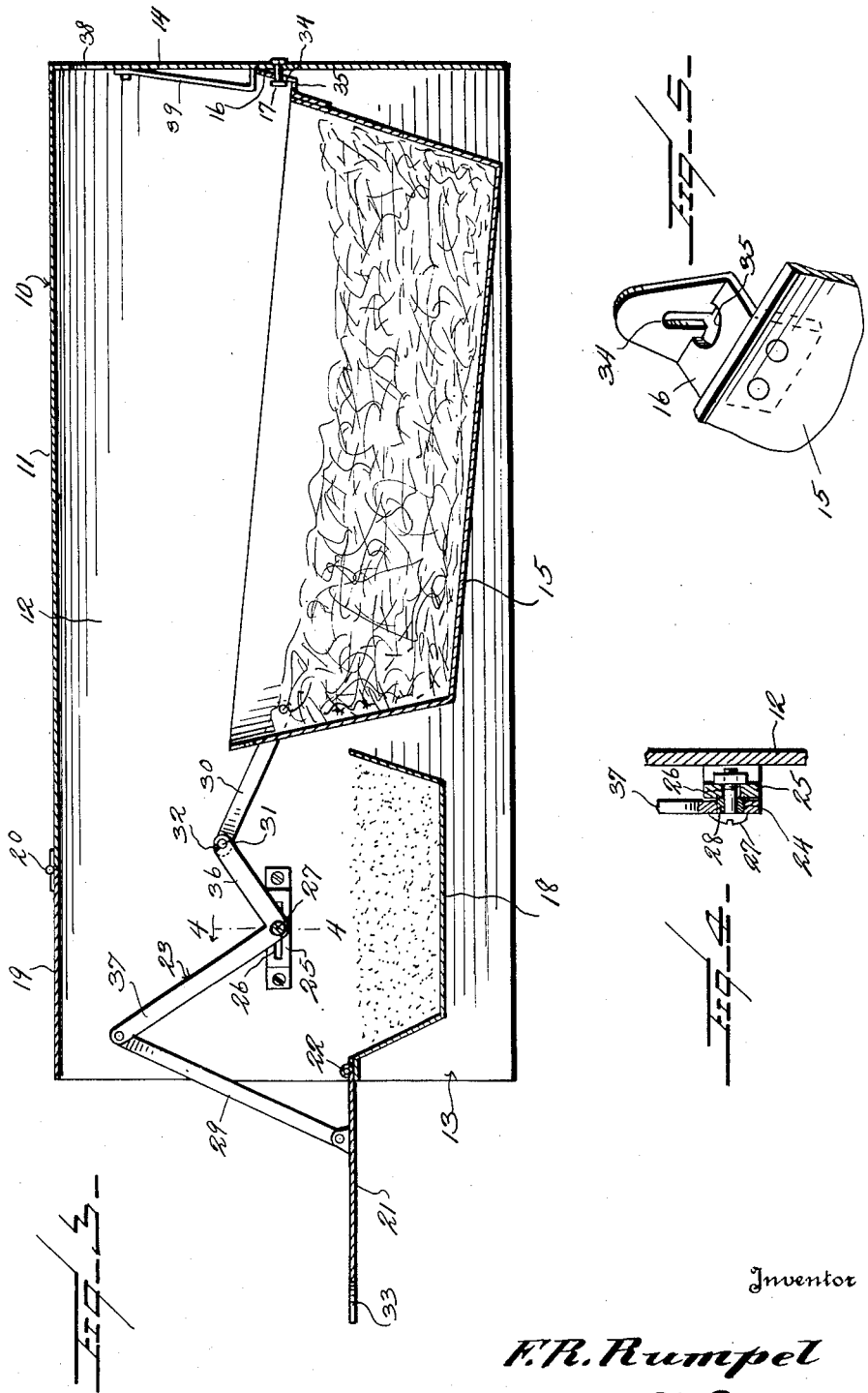
Inventor
F. R. Rumpel
By Watson E. Coleman
Attorney Patented Dec. 19, 1933

1,940,017

UNITED STATES PATENT OFFICE 1,940,017

AUTOMATIC HEN'S NEST

Fred R. Rumpel, Richfield, Idaho

Application October 22, 1931. Serial No. 570,429

3 Claims. (Cl. 119—50)

This invention relates to nests for fowl and more particularly to a nest within which the fowl may lay its eggs without being disturbed by other fowl.

An object of this invention is to provide an improved nest construction which is normally open for entrance of the fowl but which, immediately upon entrance of the fowl into the nest, will close so as to prevent disturbing of the fowl within the nest.

Another object of this invention is to provide a nest of this kind which is so constructed that after the fowl has entered the nest and laid its egg, the fowl can readily re-open the nest housing.

A further object of this invention is to provide in a nest construction of this kind, means whereby the feet of the fowl will be cleaned during its passage through the device into the nest proper.

The above and various other objects and advantages of this invention will in part be described in and in part be understood from the following detailed description of the present preferred embodiment, the same being illustrated in the accompanying drawings, wherein:—

Figure 1 is a detail front elevation of a device constructed according to the preferred embodiment of this invention:

Figure 2 is a sectional view taken on the line 2—2 of Figure 1, showing the device in closed position;

Figure 3 is a similar view showing the device in open position;

Figure 4 is an enlarged sectional view taken on the line 4—4 of Figure 3, and

Figure 5 is an enlarged perspective view showing one of the nest supporting members.

Referring to the drawings, wherein like numerals of reference designate corresponding parts throughout the several views, the numeral 10 designates generally a box-like construction which has an open forward end 13 and a top 11, which is secured to side walls 12 and a rear or end wall 14. Disposed within the housing or support 10, there is positioned a nest member 15 which is supported at the inner end thereof by means of bracket members 16 engaging headed pins 17 outstanding from the rear wall 14 of the housing or support 10.

The nest member 15 has an open top and through the use of the bracket members 16, the forward end of the nest member 15 has vertical rocking movement, the purpose for which will be hereinafter described. Disposed transversely of the housing 10 adjacent the forward end thereof is a trough or receptacle 18, which is disposed forwardly of the front end of the nest member 15, this trough or receptacle 18 being secured to the side walls 12 of the housing 10, at a point below the top 11. A plate 19 is hinged, as at 20, to the forward edge of the top 11, this plate 19 being relatively light in weight so that it may be easily lifted into an upward open position by a chicken or fowl in passing out of the housing 10.

A closure or gate 21 is hinged, as at 22, to the forward edge of the trough 18 and acts with the closure member 19 in closing the forward end of the housing 10. In order to rock the closure member 21 into closed position, I have provided a gate or closure operating structure comprising an L-shaped member 23 which is hinged, as at 24, to a bracket or slide bar 25. This bracket 25 has an elongated slot 26 extending longitudinally thereof, and the central portion of the bracket 25 is offset outwardly from the side wall 12 at the inner surface thereof. The pivotal member 24 includes a bolt 27 and a sleeve or bushing 28 loosely disposed thereabout, the bushing 28 being rotatably disposed on the bolt 27 so that the L-shaped member 23 has rocking movement on the bracket 25, and is adjustable longitudinally so as to secure the desired degree of opening of the closure 21, and also to regulate the weight required in the nest 15 so as to close the door 21. In other words, when a predetermined number of eggs have been laid in the nest 15, the door 21 will automatically close when the weight of the eggs in the nest 15 overbalances the weight of the door 21.

A link 29 connects one leg of the L-shaped member 23 with the gate or closure 21 and a link 30 is secured at one end to the nest 15 adjacent the forward end thereof. The link 30 is provided with a headed pin 31 which engages in an open slot 32 provided in the opposite leg of the L-shaped member 23. The closure 21, when in closed position, is of a height such that it will not entirely close the space between the upper edge of the trough 18 and the top closure member 19, so that a fowl disposed within the housing 10 can project its head partly through the opening and thereby cause the gate 21 to rock forwardly into a substantially horizontal position.

The gate or closure 21 is also cut out, as at 33, so as to make a relatively large opening through which the fowl may project its head. The bracket member 16 is constructed in substantially Z-shaped form with one leg thereof secured to the nest member 15 and the opposite parallel leg in upstanding position. A slot 34 is provided in the bracket 16, this slot being relatively narrow and having an enlarged end portion 35 for receiving the head of the securing member 17. Through the use of this mounting or bracket, the inner end of the nest member 15 may be readily lifted off of the supporting pin 17. The trough or tray 18 is relatively smaller or narrower in width than the length of the nest member 15 and is adapted to receive gypsum, or some other cleaning material or compound, so that when the fowl enters the housing 10 and steps into this material, its feet will be substantially cleaned before entering the nest 15.

In the operation of this device, the nest member 15 is adapted to have disposed therein suitable nesting material and the forward end thereof is in its uppermost position and the upper leg of the L-shaped member 23 is rocked forwardly, so as to hold the gate or closure member 21 in substantially horizontal position. In this position, the closure member 21 will constitute a roost upon which the fowl may initially rest before entering the housing 10. As the fowl walks forwardly into the housing 10, it will step into the cleaning material disposed within the trough 18 and passing over this trough 18 will enter the nest 15 which, due to the weight of the fowl, will rock downwardly, carrying therewith the L-shaped member 23, the short leg 36 of which will rock downwardly and carry the longitudinal leg 17 upwardly so as to pull the door or closure 21 into closed position. Due to the space formed between the upper hinged member 19 and the door 21, when the fowl desires to leave the nest 15, it can readily determine at what point to leave the nest and will, therefore, again pass over the trough 18 and project its head through the space between the hinged member 19 and the door or closure 21. As soon as the fowl steps out of the nest 15, the weight or force of the fowl against the door 21, will cause this door to swing downwardly into substantially a horizontal position and thereby leave the nest open for the entrance of other fowl.

It will be noted, from the foregoing, that the nest herein disclosed has been adapted for use by one fowl at a time, but after the fowl leaves the nest, it is again opened for the entrance of additional fowl.

The rear wall of the housing 10 is provided with ventilating openings 33 and a nest locking member 39 is dependingly and swingingly carried by the rear wall 14 in a position to prevent upward movement of the brackets or hangers 16 until the locking members 39 have been swung to one side of these hangers. Through the use of these locking members 39, the inner end of the nest 15 will not come off of the supporting pins 17 when the hen steps on the forward or front end of the nest 15. The side wall of the housing 10 oppositely from the supporting bracket 25 is provided with a stop member 40 so as to engage the closure 21 upon movement of the closure into closed position. As will be noted, from the drawing, the bottom of the housing 10 is open, this being desirable so that when the hen scratches or throws out any of the nesting material in the nest 15, it will drop on to the ground and thereby maintain the nest in its original cleaned condition. The top door 19 is also desirable in view of the fact that it is through this door that the eggs are removed from the nest 15.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An automatically operated nest structure comprising a housing, a nest member rockably mounted in the housing, a closure hingedly connected at one end to the housing, connecting means connecting the closure with the nest member whereby to rock the closure into open or closed position coactively with the rocking of the nest member, and means for adjustably mounting said connecting means in the side wall of the housing in a position to effect the desired degree of opening of the closure.

2. An automatic nest comprising a housing, a nest in the housing, means for mounting the nest for rocking movement in the housing, a closure for one end of the housing, means engaging the lower edge of the closure to mount the closure for free outward and downward swinging movement, a lever, means for rockably mounting the lever on one side of the housing, link means connecting the lever with the nest, and a second link means connecting the lever with the closure whereby upon swinging of the closure beyond the vertical, the closure will gravitatingly swing into open position and simultaneously raise one end of the nest.

3. An automatic nest comprising a housing having an opening at one end, a closure for said opening, a nest within the housing, means for rockably mounting the nest in the housing, means connected to the closure and to the nest to open and close the closure coactively with the rocking of the nest, said closure connecting means substantially balancing the closure in the opening of the housing, a trough extending inwardly from the bottom of the opening forwardly of the nest, and a cleansing material in the trough.

FRED R. RUMPEL.